US009606248B2

United States Patent
McCormick et al.

(10) Patent No.: US 9,606,248 B2
(45) Date of Patent: Mar. 28, 2017

(54) NEUTRON SENSITIVITY USING DETECTOR ARRAYS

(75) Inventors: Dan Jay McCormick, Hudson, OH (US); Frederick L. Glesius, Brecksville, OH (US); Thomas Robert Anderson, Perry, OH (US); Nathan Herbert Johnson, Garfield Heights, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1829 days.

(21) Appl. No.: 12/422,454

(22) Filed: Apr. 13, 2009

(65) Prior Publication Data
US 2010/0258734 A1   Oct. 14, 2010

(51) Int. Cl.
G01T 3/00   (2006.01)
(52) U.S. Cl.
CPC .................... *G01T 3/008* (2013.01)
(58) Field of Classification Search
USPC .................................................. 250/390.01
See application file for complete search history.

(56) References Cited

U.S. PATENT DOCUMENTS

| | | | | |
|---|---|---|---|---|
| 3,930,162 | A * | 12/1975 | Reiss | 250/385.1 |
| 6,426,504 | B1 | 7/2002 | Menlove et al. | |
| 7,002,159 | B2 | 2/2006 | Lacy | |
| 7,078,705 | B1 * | 7/2006 | Ianakiev et al. | 250/390.01 |
| 2003/0213917 | A1 * | 11/2003 | Menlove et al. | 250/390.01 |

OTHER PUBLICATIONS

Bellinger, S.L., W.J. McNeil, D.S. McGregor,209, "Improved Fabrication Technique for Microstructured Solid-State Neutron Detectors," S.M.A.R.T. Laboratory, Mechanical and Nuclear Engineering Dept., Kansas State University, Manhattan, KS 66506.
McGregor, M.C., Hammig, M.D., Yang, Y.-H., Gersch, H.K., and Klann, R.T., 2003, "Design Considerations for Thin Film Coated Semiconductor Thermal Neutron Detectors—I: Basics Regarding Alpha Particle Emitting Neutron Reactive Films," Nucler Instruments & Methods in Physics Research A, 500, pp. 272-308.
McNeil, W.J., Bellinger, S.L., Unruh, T.C., Henderson, C.M., Ugorowski, P., et al. 2009, "1-D Array of Perforated Diode Neutron Detectors," Nuclear Instruments and Methods in Physics Research A, 604, pp. 127-129.
Shultis, J.K., and McGregor, D.S., 2009, "Design and Performance Considerations for Perforated Semiconductor Thermal-Neutron Detectors," Nuclear Instruments and Methods in Physics Research A, doi: 10.1016/j.nima.2009.02.033.
Unruh, T.C., Bellinger, S.L., Huddleston, D.E., McNeil, W.J., Patterson, E., et al., 2009, Design and Operation of a 2-D Thin Film Semiconductor Neutron Detector Array for Use as a Beamport Monitor, Nuclear Instrucments and Methods in Physics Research A, 604, pp. 150-153.

* cited by examiner

*Primary Examiner* — David Porta
*Assistant Examiner* — Carolyn Igyarto
(74) *Attorney, Agent, or Firm* — Cooper Legal Group, LLC

(57) ABSTRACT

A neutron detector includes an anode and a cathode. The cathode circumscribes the anode and has a plurality of planar segments facing the anode. In one embodiment, the neutron detector is part of an array of neutron detectors.

16 Claims, 3 Drawing Sheets

NEUTRON SENSITIVITY USING DETECTOR ARRAYS

BACKGROUND OF THE INVENTION

Field of the Invention

The invention relates to neutron detectors, and specifically relates to detectors that have cathode shaping for improved space utilization.

Discussion of Prior Art

Recently, high sensitivity neutron detectors for homeland security have become increasingly important and increasingly in demand. Many known neutron detectors utilize He-3, a neutron sensitive material known to provide a detector of high sensitivity. The He-3 is provided within a volume that includes a cathode within a detection arrangement. Recently, the availability of He-3 has been has become insufficient to satisfy the demand associated with high sensitivity neutron detectors. Other than He-3 there are only a few neutron sensitive materials that are useful for constructing a neutron detector, including certain isotopes of uranium, lithium and boron.

Focusing for the moment upon the physical construction of neutron detectors and neutron detector arrangements, a neutron detector includes an anode and a cathode. One example detector includes a wire extending on an axis for the anode and a cylindrical cathode circumscribing the anode. Often, detector arrangements are configured to have a large number of individual detection pairs (i.e., a single cathode and a single anode) for high sensitivity. Also, logically, using plural detectors permits detection over a greater area that might be possible upon using just a single detector. For example, a single detector (i.e., a single anode and a single cathode) has a practical limitation on overall size.

Focusing upon boron, the majority (e.g., approximately 80%) of naturally occurring boron is B-11, which has 5 protons and 6 neutrons, and the remainder (e.g., approximately 20%) is Boron 10 (B-10), which has 5 protons and 5 neutrons. Only the B-10 isotope is useful for neutron detection. Thus, for use in a neutron detector, it is typically desirable to enrich the concentration of B-10.

As mentioned, the detection of neutrons is based on the generation of secondary radiations. With B-10 ($^{10}$B) as the converter material, the reaction is described as follows when a neutron is captured:

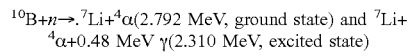

$^{10}B+n \rightarrow {}^{7}Li+{}^{4}\alpha(2.792$ MeV, ground state) and $^{7}Li+$
$^{4}\alpha+0.48$ MeV $\gamma(2.310$ MeV, excited state)

The energy released by the reaction is approximately 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle ($\alpha$) and a lithium nucleus ($^{7}$Li) are emitted isotropically from the point of neutron capture by B-10 in exactly opposite directions and, in the case of the dominant excited state, with kinetic energies of 1.47 MeV and 0.84 MeV, respectively.

Turning back to physical construction of neutron detector arrangements, within a He-3 detector arrangement, each detection pair is often relatively small since the sensitivity is relatively high. This allows good resolution (i.e., the ability to discriminate neutron trajectory determination. A new generation of neutron detectors would be most beneficial if the new generation detectors provided a similar level of resolution as existing He-3 detectors without significant change to overall dimensions of the detectors. Another way of considering this idea is that the new generation of detectors must be physically similar to existing detectors so they can be easily retrofitted and must have comparable neutron sensitivity and gamma rejection as He-3.

As mentioned, the use of B-10 for neutron detection is known. However, the use of B-10 in known sensor configurations (i.e., plated onto the cathode structure of known sensors) has limited sensitivity. Specifically, B-10 coating on the cathode structure is relatively thin and such detectors achieve only a few percent efficiency, due to the fact that the thicknesses needed for a substantial capture of neutrons exceeds the escape range of the neutron capture reaction products. In one example, the optimal thickness of a B-10 coating is 0.4 mg/cm$^2$. So in many instances, capture reaction products can not escape. Only conversions of neutrons in a very thin layer near the surface of the B-10 adjacent the counting gas are detected efficiently. Since this very thin, top layer of the B-10 coating captures only a very small percentage of the incident neutrons, efficiency of a neutron detector of such simple design is understandably low.

A new generation of neutron detectors would be most beneficial if the new generation provided a similar level of neutron sensitivity and a discrimination of gamma rays without significant change to overall dimensions of the detectors.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a neutron detector that includes an anode and a cathode. The cathode circumscribes the anode and has a plurality of planar segments facing the anode.

Another aspect of the invention provides a neutron detector array that includes a plurality of neutron detectors. Each neutron detector includes an anode and a cathode. The cathode circumscribes the anode and has a plurality of planar segments facing the anode.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
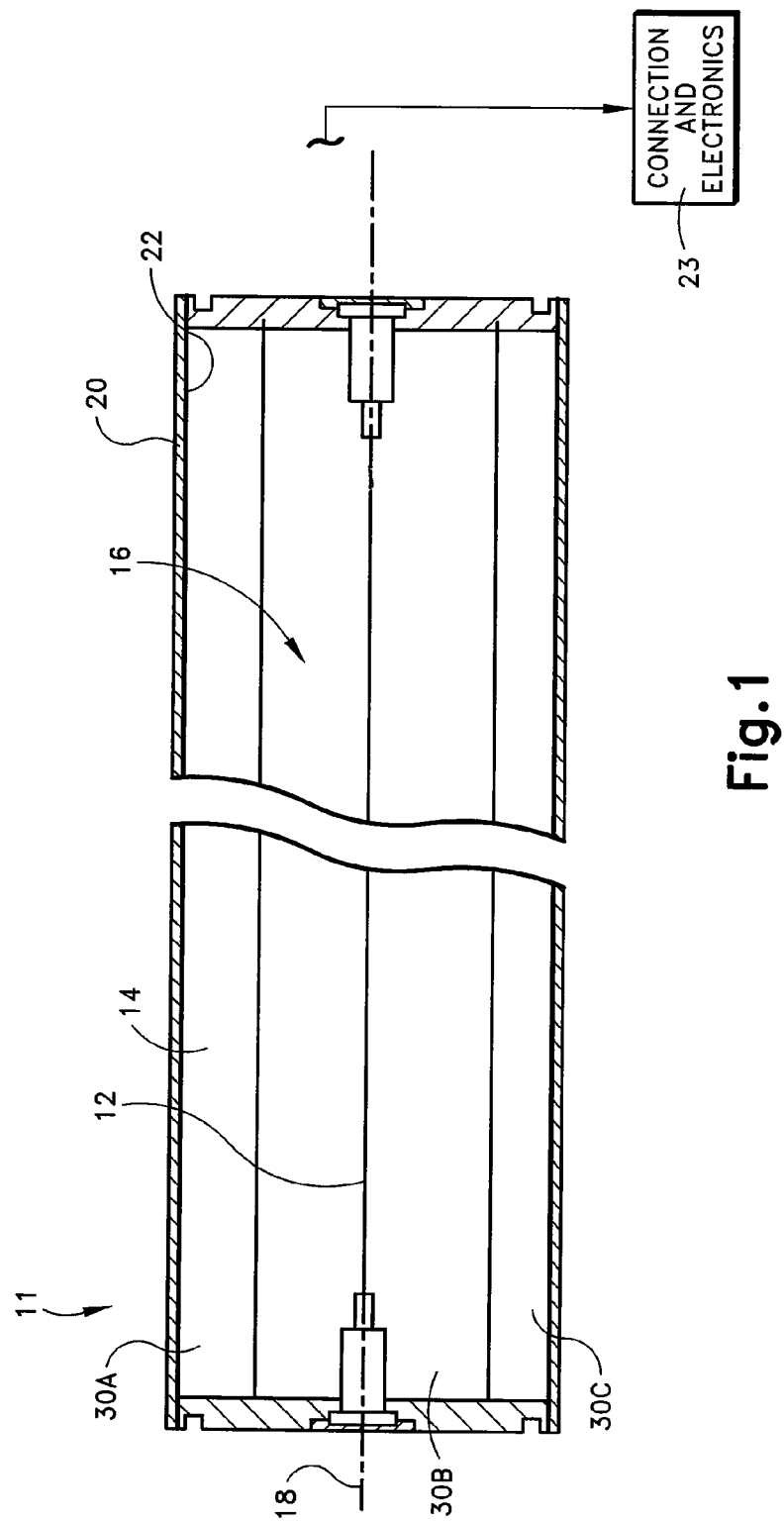
FIG. 1 is a schematic cross-section of an example neutron detector in accordance with one aspect of the invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example embodiment of a neutron detector 11 that includes one aspect of the invention is shown in FIG. 1. Basically, the neutron detector 11 includes a pair of electrodes, which are an anode 12 and a cathode 14. The anode 12 and cathode 14 are separated from each other within a volume 16. In the shown example the cathode 14 provides part of the outer boundary of the volume 16. The volume 16 is sealed and contains a gas, such as argon with an additive of carbon-dioxide. The anode 12 is electrically conductive and electrically connected to detection electronics as will be appreciated by the person of skill in the art. In the shown example, the anode 12 is elongate and extends along an axis 18 of the neutron detector 11 and the cathode 14 is cylindrical and extends around the anode 12 and the axis 18. In one example, the anode 12 is a wire that is in the range of 0.0254-0.0508 mm (0.001-0.002 inches) in diameter. As mentioned, such a size range is merely an example. Accordingly, such an example should not be considered to be a limitation upon the invention. The cathode 14 includes a supporting substrate 20 and a layer 22 of a neutron sensitive boron material on the substrate. In one specific example, the boron material is enriched to have a high content of B-10. One example of a high content of B-10 is a content of B-10 greater than 90%. The layer 22 of the cathode 14 faces (i.e., is exposed to) the anode 12. As such, the layer 22 is an interior face of the cathode 14 which contains boron (B-10). Another way of presenting this is that the cathode 14 has an interior face that includes the boron.

Sensing a neutron is accomplished by a current pulse that occurs between the anode 12 and cathode 14, through the gas, when a neutron impinges upon the B-10 boron of the cathode. When a neutron is absorbed by a B-10 atom in the layer 22 on the cathode 14, an alpha particle (i.e., a helium-4 nucleus) and lithium-7 nucleus—both positively charged—are generated and are ejected in opposite directions along a straight line, the orientation of which is random. One of these particles will not emerge from the B-10 layer because its direction of motion is towards the cathode. The other particle moves towards the gas/coating interface from which it will emerge if it has enough energy. When one of these nuclear particles passes into the gas within the volume 16, it ionizes the gas. The negative ion particles, electrons, drift towards the anode 12 and as the negatively charged particles approach sufficiently near the anode (e.g., within 1-3 anode diameters) the negatively charged particles accelerate to the point of generating even more charge. This is called "gas gain" and it generates enough charge so that the resulting current has a perceptible effect within an associated electronics arrangement 23 (shown schematically within FIG. 1) operatively connected to the neutron detector 11. Thus, the current at the anode 12 is detectable and quantifiable. It is to be appreciated that in one example, the associated electronics arrangement 23 includes an electronic amplifier in order to aid in processing the current generated at the anode. It is to be appreciated that general operation/structure of neutron detectors and associated electronics arrangements will be appreciated by the person of skill in the art.

Often multiple neutron detectors are used within a single arrangement. It is to be acknowledged that there is often a desire for a neutron detector arrangement to be of particular size. In one example, a neutron detector arrangement that includes B-10 within the cathode would be sized the same as a neutron detector arrangement that includes He-3 within the cathode. This would allow the neutron detector arrangement that includes B-10 within the cathode to be a good physical size replacement for the neutron detector that includes He-3 within the cathode. It is worth noting that a neutron detector that includes He-3 within the cathode can vary in size, but since He-3 neutron detectors are appreciated to have a fairly high sensitivity and a relatively small size, many such He-3 detectors can be placed into a small area for high sensitivity.

In order to provide a desired size of a B-10 neutron detector arrangement (e.g., generally equal size of a He-3 neutron detector arrangement) and yet obtain desired sensitivity (e.g., generally equal sensitivity to a He-3 neutron detector arrangement), one aspect of the invention provides for the cathode 14 to be configured and/or positioned so that adjacent neutron detectors can be located immediately adjacent to each other without unutilized space. In one specific configuration of a neutron detector arrangement 36 (see FIG. 2), the adjacent locations of the neutron detectors 11 are contiguous and gapless in an array. Another aspect is that the neutron detectors 11 touch each other. Still another aspect is that the neutron detectors 11 nest into each other.

The ability to provide the neutron detector arrangement 36 that avoids unutilized space is provided by another aspect of the invention, which is the cathode 14 having the plurality of planar segments (e.g., 30A-30C, see FIG. 1). It is worth noting that with the cathode having the plurality of planar segments (e.g., 30A-30C), the planar segments face the anode 12. But also, planar segments (e.g., 30A) of two adjacent neutron detectors 11 are locatable immediately next to each other. In contrast, for cylindrical neutron detectors, the cylinder shape only permits adjacent neutron detectors to in very close proximity at a single point location on a circular cross-section. Thus, there is an amount unutilized space within a neutron detector arrangement that includes an array of cylinder-shaped neutron detectors. Each of the planar segments extend in a direction parallel to one another. Each of the planar segments are equally spaced from the anode at there axially extending middles (don't know if this buys us anything).

The example of FIG. 1 includes one example embodiment of planar segments (e.g., 30A-30C) that provide the cathode 14. Specifically, the cathode 14 has a six-sided (hexagon) configuration. Only three (one complete and two partial) planar segments 30A-30C are shown in FIG. 1 because of the removed section.

Figure 2:
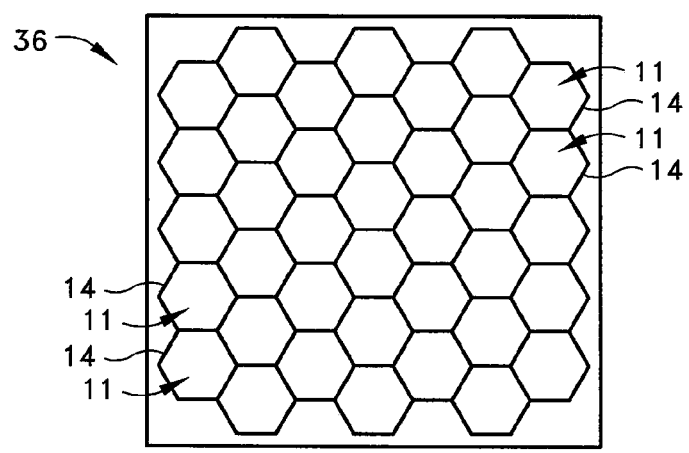
FIG. 2 is an example configuration layout for multiple neutron detectors in accordance with another aspect of the invention and which includes the example neutron detector of FIG. 1.

The example six-sided neutron detector 11 can be used in the example neutron detector arrangement 36 as shown in FIG. 2. As can be appreciated, the neutron detector arrangement 36 has a plurality of individual neutron detectors 11 (i.e., each would have an anode and cathode pair, only a few of the plural neutron detectors are labeled with reference number 11 to avoid drawing clutter). The shown example of FIG. 2 has 38 separate neutron detectors 11. Of course, other examples may have different numbers of detectors. In FIG.

2, the neutron detector arrangement 36 is only schematically shown and has at least some structure removed to permit ease of viewing the configuration of the cathodes 14 of the neutron detectors 11 of the arrangement 36. In the shown example, all of the individual neutron detectors 11 are similar shaped (i.e., all six-sided) and are placed to fit/interfit together. This provides a honeycomb configuration. It should be noted that the six-sided shaped fit together so that the arrangement is contiguous and gapless. In other words, there is no unutilized area left.

It is to be appreciated that other multi-sided shapes could be used for the cathodes and thus the neutron detectors. Specifically, the number of planar segments within the cathode of each neutron detector would be something other than six. In accordance with the one aspect of the invention, such other multi-sided shapes would fit/interfit together so that the arrangement of neutron detectors is contiguous, gapless, and there is no unutilized area. It is possible that all of the multi-sided shapes of the neutron detectors are not all identical. The different multi-sided shapes of the neutron detectors would fit/interfit together so that the arrangement of neutron detectors is contiguous, gapless, and there is no unutilized area left. It is to be noted that the overall shape of a neutron detector arrangement in accordance with the invention may be of an overall outer shape that is different from the overall outer shape of the example shown in FIG. 2. For example, the overall outer shape may be generally more round, more oval or more rectangular than the example shown in FIG. 2.

It is worth noting that a neutron detector arrangement (e.g., 36) that contains many individual detectors (i.e., cathode and anode pairs) in accordance with the one aspect of the invention will offer or present a greater amount of surface area of neutron sensitive material as compared to a single detector (i.e., one cathode and one anode) that has generally the same outer dimension(s). So, with the use of a neutron detector arrangement (e.g., 36) in accordance with one aspect of the invention, neutrons will have a greater amount of surface of the neutron sensitive material upon which to impinge and interact. Such a benefit may be useful when neutron sensitive material that is not of high sensitivity, such as B-10, is utilized. For the sake of providing an example of outer dimension(s), one example of outer dimensions is 50.8 mm (2 inches) by 101.6 mm (4 inches). For such example, each neutron detector 11 could have a width of about 8-10 mm (0.31496-0.39370 inch). Of course, such an example is not to be considered a limitation on the invention and outer dimension(s) may certainly be varied.

Figure 3:
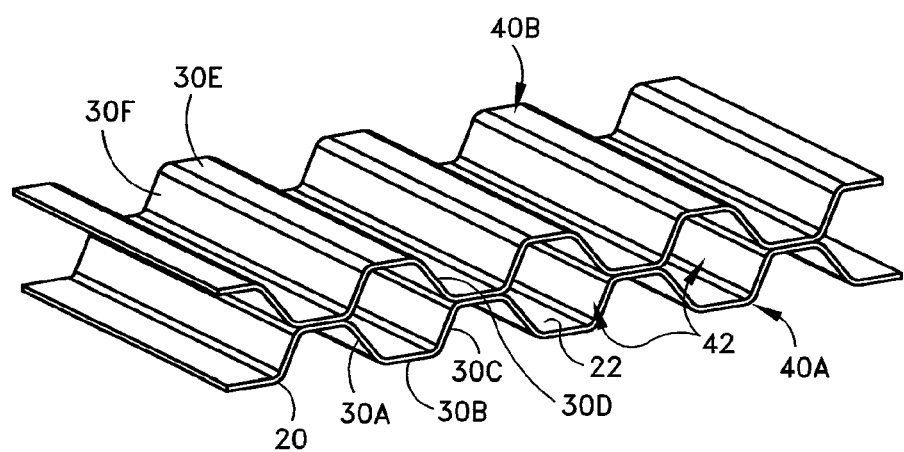
FIG. 3 is a perspective view of two formed sheets of material used to provide cathode substrates of multiple, adjacent neutron detectors as an example in accordance with the aspect shown within FIG. 2.

The multi-sided cathode 14 in accordance with the one aspect of the invention may be constructed in various ways using various methodologies. One example methodology in accordance with another aspect of the invention will be appreciated upon viewing FIGS. 3-5. Specifically, FIG. 3 shows two sheets 40A, 40B of undulated substrate material that are placed together to provide multiple tube segments 42 that each have six planar segments 30A-30F. The two sheets 40A, 40B are the supporting substrate 20 (refer back to FIG. 1) and each tube segment 42 is a cathode 14. Thus, the two sheets 40A, 40B are two members that together provide the cathode substrate.

Figure 4:
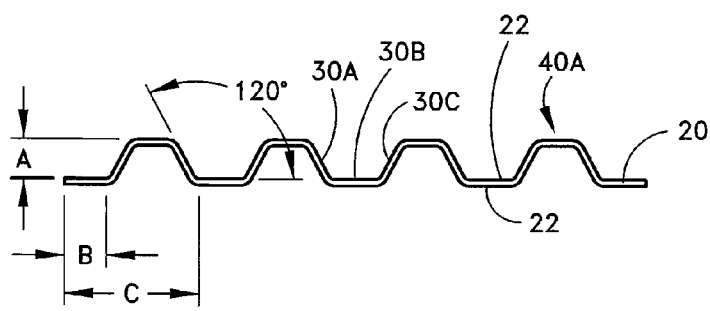
FIG. 4 is an end view of one of the sheets of FIG. 3 and shows example shape configurations and dimensions.

FIG. 4 is an end view of one of the example sheets (e.g., 40A) of undulated supporting substrate material 20. The undulations are not smooth and sinusoidal. Instead, each undulation is made by flat segments (e.g., 30A-30C) orientated (e.g., bent or formed) at a 120° to each adjacent flat segment. Dimensions for the example sheet (e.g., 40A) are identified as A, B and C. In one specific example, A=0.16 inch (4.064 mm), B=0.15 inch (3.81 mm) and C=0.5 inch (12.7 mm). Of course, such orientations and/or dimensions are for only one example and other dimensions may be used, and as such the example is not a required limitation upon the invention.

One example methodology for utilizing the sheet of undulated substrate material (e.g., 40A) for the creation of the cathode(s) 14 and thus the neutron detector(s) 10 is to coat a side of the sheet of substrate material with neutron sensitive material. In a further modification of this methodology, both sides of the sheet of undulated substrate material are coated with a layer 22 of neutron sensitive material. In one example, the neutron sensitive material is boron. Of course other neutron sensitive materials, such as uranium or lithium, could be used for the coating. However, it is with the use of boron that is enriched to have a high content of B-10 which may be of some interest as a coating in accordance with at least one aspect of the invention due do a more readily available supply. Again, one example of a high content of B-10 is a content of B-10 greater than 90%.

Focusing upon FIG. 3 again, it is to be appreciated that with both sides of each of undulated substrate material sheet (e.g., 40A) coated with a layer 22 of with neutron sensitive material and with two sheets (e.g., 40A and 40B, see FIG. 3) placed together to create the six-sided cathodes 14, multiple cathodes are swiftly created. In the shown example of FIG. 3, three separate cathodes 14 for three neutron detector are quickly created. Thus, the two sheets (e.g., 40A and 40B) of undulated substrate material extend to provide respective cathodes of a plurality of neutron detectors.

Figure 5:
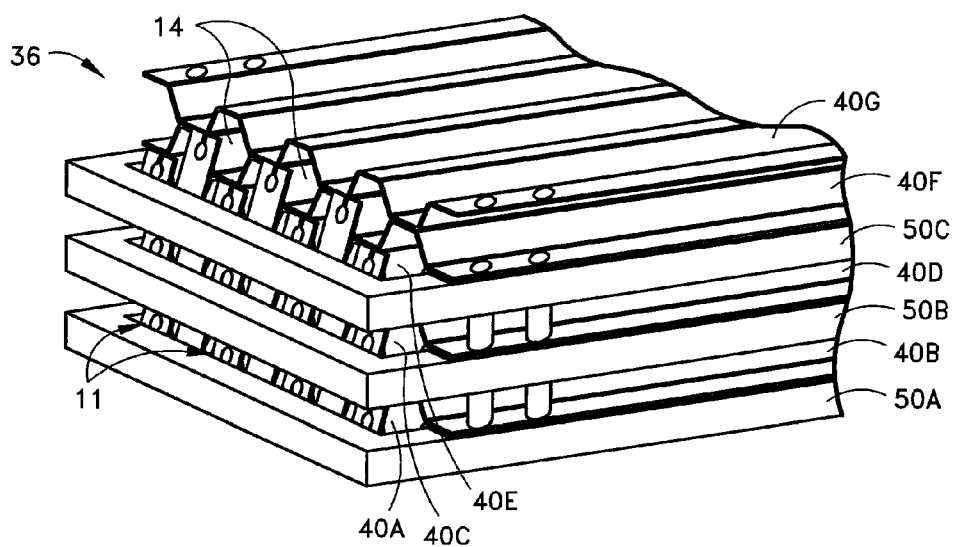
FIG. 5 is a perspective view of multiple neutron detectors being assembled in accordance to the example utilizing sheets shown in FIG. 3.

Turning now to FIG. 5, it is to be appreciated that upon stacking additional sheets (e.g., 40C-40G) of the coated undulated substrate material, additional cathodes 14 are created upon each sheet addition. The example of FIG. 5 shows that twenty-one cathodes 14 have been created (only a few cathodes are identified by reference number 14 to avoid drawing clutter). Moreover, upon review of FIGS. 2 and 5 it will be appreciated that the arrangement is contiguous and gapless (i.e., no unutilized area is left) between cathodes 14 of adjacent neutron detectors 11 (only a few neutron detectors are identified by reference number 11 to avoid drawing clutter). The cathodes 14 fit together to provide the honeycomb configuration. Cathodes 14 of adjacent neutron detectors 11 may even share a substrate wall, with the substrate wall being coated on both sides with neutron sensitive material.

It is worth noting that it is possible that some segment(s) of the undulated substrate material sheets (e.g. 40A and 40B, see FIG. 3) may not be part of a complete cathode. It is contemplated that as part of the methodology to coat neutron sensitive material onto the undulated substrate material sheet, the neutron sensitive material not be coated onto the segment(s) of the undulated substrate material sheet (e.g., 40A) that will not be part of a complete cathode. This would help prevent neutron interaction with neutron sensitive material that is not part of a complete neutron detector.

Aside from providing the arrangement of cathodes 14 via the stacking of sheets (e.g., 40A-40G, see FIG. 5) of the coated undulated substrate material, other structural features of the neutron detector arrangement 36 are provided, but may not be limitations upon the invention. For example, FIG. 5 shows support structures 50A-50C for supporting an array of anode wires (not shown in FIG. 5 to avoid drawing clutter). Each anode wire is supported to extend along the central axis of a respective cathode, similar to the anode wire location as shown in FIG. 1. In the shown example, the support structures 50A-50C each include a surrounding bracket that in turn support extending tabs that hold the anode wires.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A neutron detector including:
   an anode; and
   a cathode extending around the anode and having a six planar segments facing the anode and extending parallel to each other along the length of the cathode, the segments being coated with neutron-sensitive material that includes B-10 to interact with neutrons at the segments.

2. A detector as set forth in claim 1, wherein the detector is part of an array of neutron detectors, and at least some of the planar segments of the cathode has a substrate that is shared as a substrate of a cathode of an adjacent detector within the array.

3. A detector as set forth in claim 2, wherein the array of detectors has a honeycomb configuration, and the planar segments of the cathodes extend such that the honeycomb configuration is contiguous and gapless.

4. A detector as set forth in claim 2, wherein the shared substrate has two sides, with each side facing inward for the respective anode of the respective neutron detector, both of the two sides of the shared substrate are coated with the neutron-sensitive material.

5. A detector as set forth in claim 1, wherein the cathode has a substrate provided as two separate members.

6. A detector as set forth in claim 5, wherein the two separate members are two sheets of undulated substrate material, wherein each separate member provides three of the six planar segments of the cathode.

7. A detector as set forth in claim 6, wherein the two sheets of undulated substrate material extend to provide respective cathodes of a plurality of neutron detectors, wherein for each of the respective cathodes each separate member provides three of the six planar segments.

8. A detector as set forth in claim 1, wherein the detector is part of an array of neutron detectors, the planar segments of cathodes of adjacent neutron detectors are configured such that the array is contiguous and gapless.

9. A detector as set forth in claim 1, wherein the detector is part of an array of plural neutron detectors and the neutron detectors nest into each other.

10. A detector as set forth in claim 1, wherein the detector is part of an array of plural neutron detectors and the neutron detectors touch each other.

11. A detector as set forth in claim 1, wherein the anode is elongate and each of the six planar segments of the cathode is elongate.

12. A detector as set forth in claim 11, wherein the elongate anode extends parallel to the six elongate planar segments of the cathode.

13. A neutron detector array including a plurality of neutron detectors, wherein each neutron detector including:
   an anode; and
   a cathode extending around the anode and having a six planar segments facing the anode and extending parallel to each other along the length of the cathode, the segments being coated with neutron-sensitive material that includes B-10 to interact with neutrons at the segments.

14. A detector array as set forth in claim 13, wherein the planar segments of cathodes of adjacent neutron detectors are configured such that the array is contiguous and gapless.

15. A detector array as set forth in claim 13, wherein the array of detectors has a honeycomb configuration and the six planar segments of the neutron detectors nest into each other.

16. A detector array as set forth in claim 13, wherein the neutron detectors touch each other.

* * * * *

UNITED STATES PATENT AND TRADEMARK OFFICE
CERTIFICATE OF CORRECTION

PATENT NO.         : 9,606,248 B2
APPLICATION NO.    : 12/422454
DATED              : March 28, 2017
INVENTOR(S)        : Dan Jay McCormick et al.

It is certified that error appears in the above-identified patent and that said Letters Patent is hereby corrected as shown below:

Column 1, Line 17, please delete the words "has been has" and insert the word --has--

Column 4, Lines 51 and 52, please delete the words "(don't know if this buys us anything)"

Column 6, Line 19, please delete the word "do" and insert --to--

Signed and Sealed this
Sixth Day of June, 2017

Michelle K. Lee
*Director of the United States Patent and Trademark Office*